Figure 1:
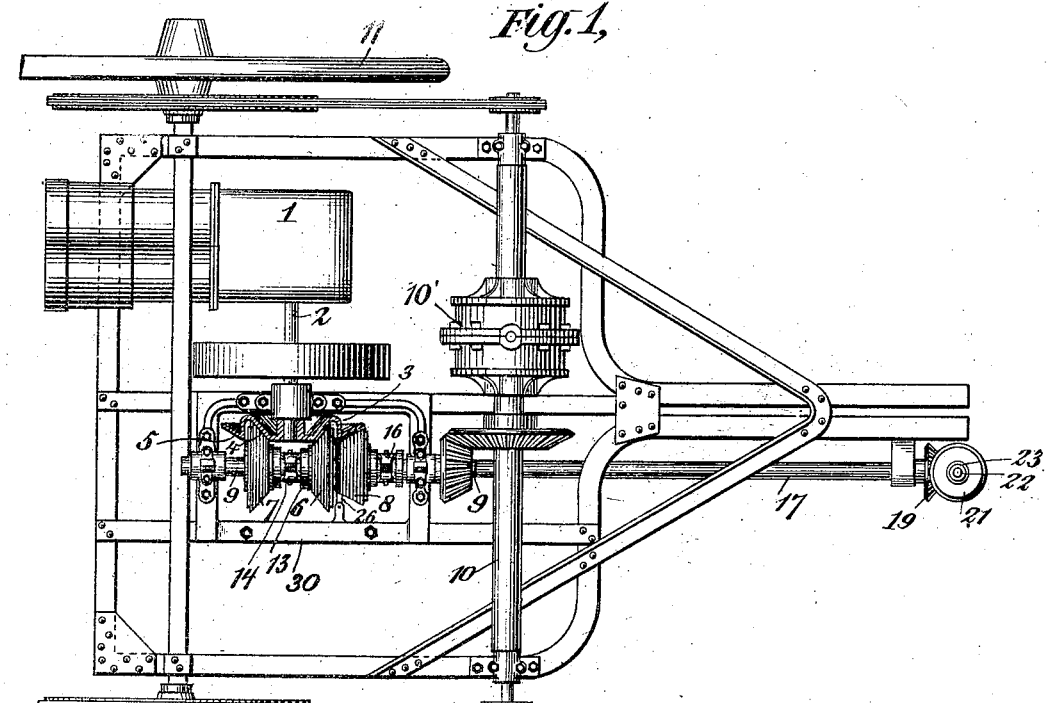

No. 617,819. Patented Jan. 17, 1899.
L. B. SMYSER.
GEARING FOR MOTOR VEHICLES.
(Application filed Dec. 18, 1897.)

(No Model.) 3 Sheets—Sheet 1.

WITNESSES: INVENTOR
Louis B. Smyser
BY
ATTORNEYS

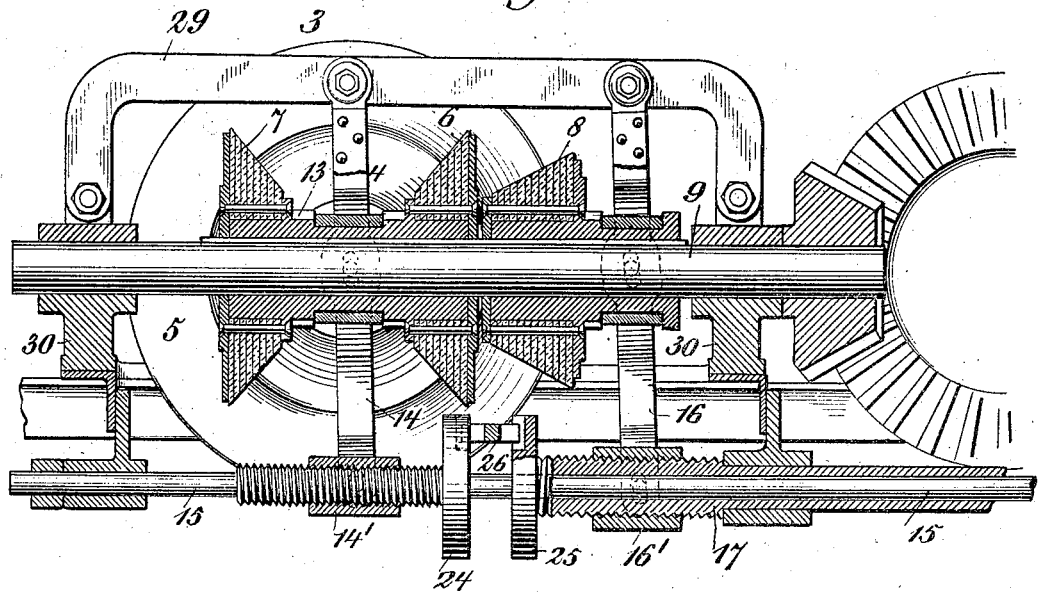
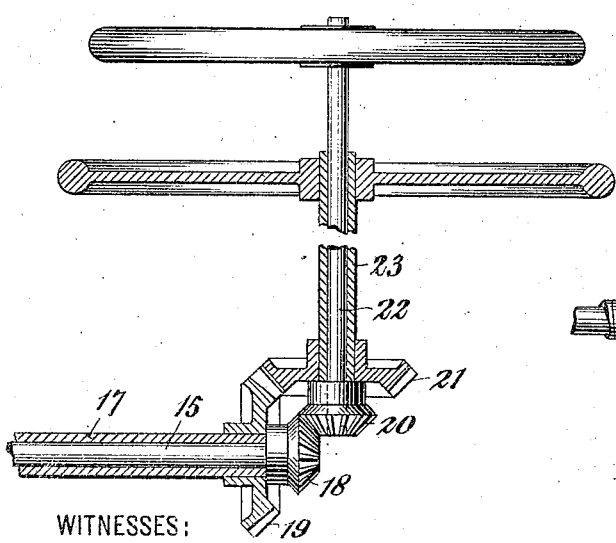
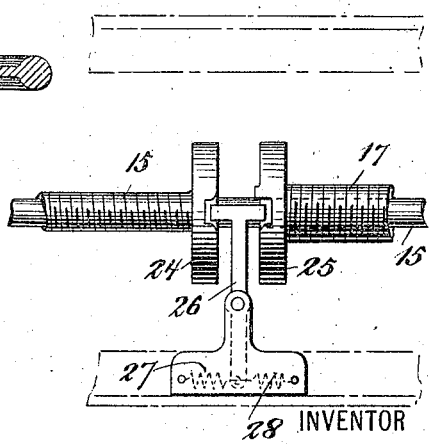

No. 617,819. Patented Jan. 17, 1899.
L. B. SMYSER.
GEARING FOR MOTOR VEHICLES.
(Application filed Dec. 18, 1897.)
(No Model.) 3 Sheets—Sheet 3.
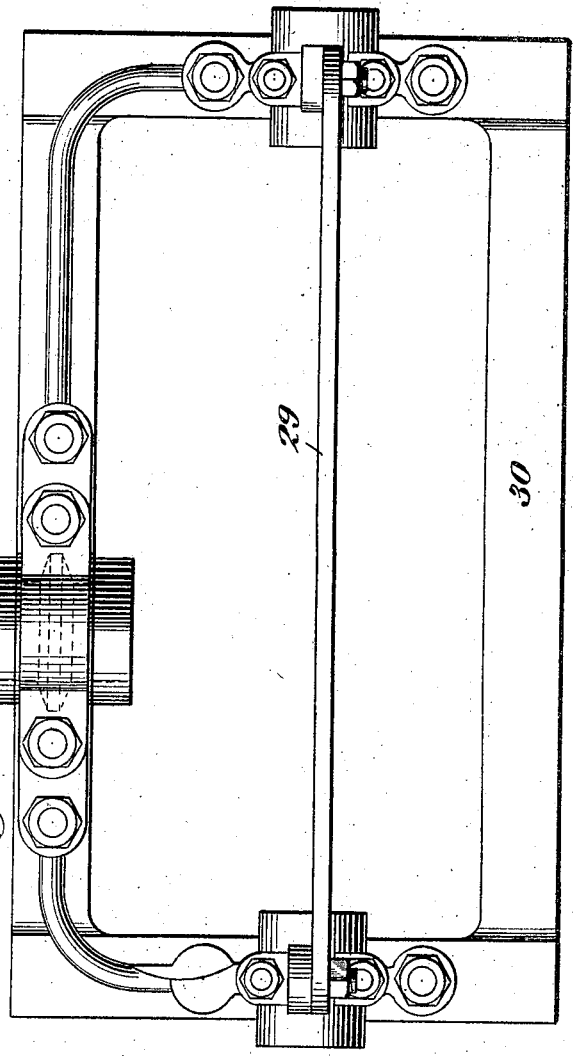
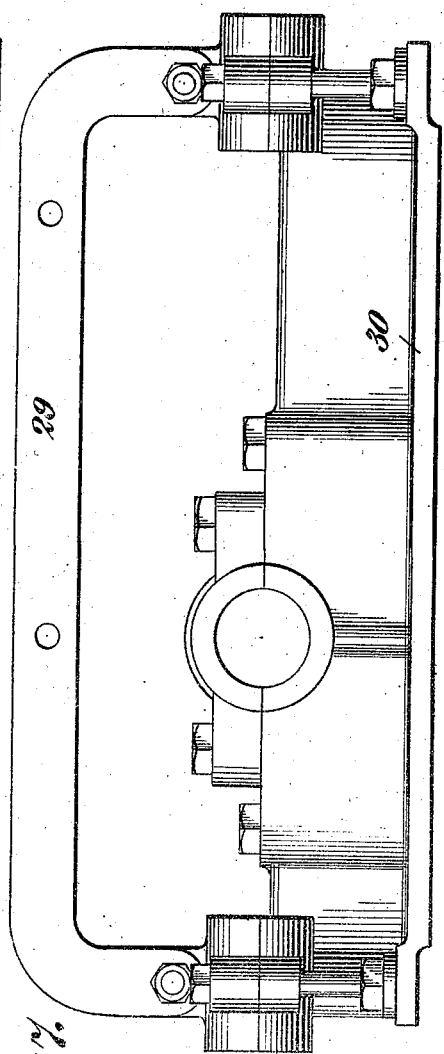
WITNESSES:
INVENTOR
Louis B. Smyser
BY
E. M. Marlborough
ATTORNEYS

UNITED STATES PATENT OFFICE.

LOUIS B. SMYSER, OF ELIZABETH, NEW JERSEY, ASSIGNOR TO FERDINAND E. CANDA, OF NEW YORK, N. Y.

GEARING FOR MOTOR-VEHICLES.

SPECIFICATION forming part of Letters Patent No. 617,819, dated January 17, 1899.

Application filed December 18, 1897. Serial No. 662,393. (No model.)

*To all whom it may concern:*

Be it known that I, LOUIS B. SMYSER, a citizen of the United States, residing at Elizabeth, in the county of Union and State of New Jersey, have invented certain new and useful Improvements in Gearing; and I do hereby declare the following to be a full, clear, and exact description of the invention, such as will enable others skilled in the art to which it appertains to make and use the same My invention relates generally to gearing, and particularly to controlling gearing for gas, oil, electric, or other motors by which a motor may be thrown into and out of gear with mechanism which it is arranged to drive and by which the speed and direction of motion of such driven mechanism may be varied.

My invention is particularly applicable for use upon motor-vehicles, launches, &c.

It consists in the novel construction and arrangement of the elements of the gearing, in the novel arrangement of the operating devices employed for throwing into and out of gear the various portions of said gearing, in the novel means employed for preventing the throwing of one friction-wheel into gear when another friction-wheel is already in gear, and generally in the novel combination, construction, and arrangement of parts.

The objects of my invention are, first, to provide simple, compact, and effective mechanism for changing the direction and speed of revolution imparted by a motor or driving member of a mechanism to the driven member of the mechanism and for throwing the driven member out of gear with the driving member at will; second, to provide simple, compact, effective, and easily-operated devices for operating such controlling mechanism or gearing, and, third, to provide means for preventing the throwing of one friction-wheel into gear when another friction-wheel is already in gear. These objects are attained in the invention herein described and illustrated in the drawings which accompany and form a part of this specification, in which the invention is shown as forming a portion of the driving mechanism of a motor-wagon, the essential portions of which only are illustrated.

Figure 2:
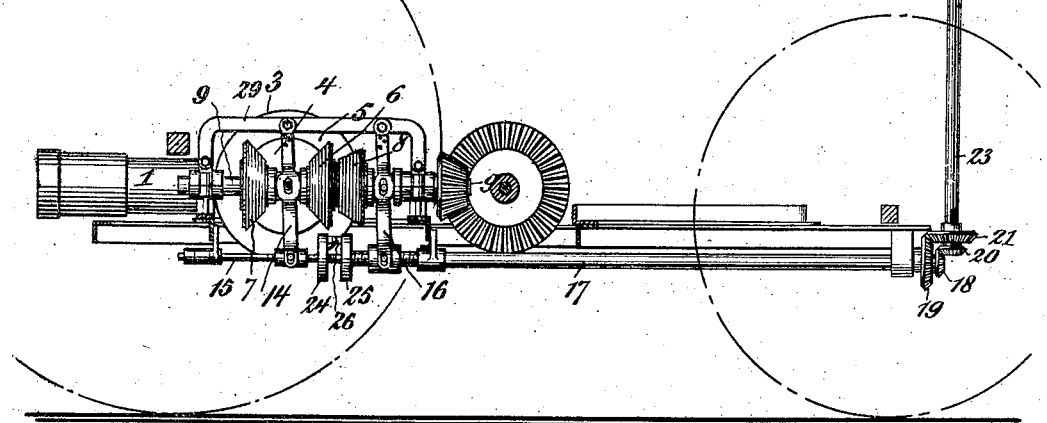

In the drawings, in which the same reference-numerals indicate the same or corresponding parts, Figure 1 is a plan view of the running-gear of a motor-wagon, such running-gear containing my invention. Fig. 2 is a side elevation and partial section of the same. Fig. 3 is a vertical section through the axis of the friction-wheels. Fig. 4 is a detail sectional view showing the concentric arrangement of the shafts by which the friction-wheels are thrown into and out of gear with the friction-disk. Fig. 5 is a detail view showing a locking device which may be employed for preventing the throwing into gear of the high-speed friction-wheel when one of the low-speed friction-wheels is already in gear, or vice versa. Fig. 6 is a plan view of the yoke surrounding the friction-gears and which holds their shafts in the proper relative position, and Fig. 7 is an elevation of said yoke.

In the drawings, 1 is the motor, driving element, or source of power, and as illustrated is an oil-engine of ordinary type. The details of this engine it is unnecessary to illustrate. Upon its crank-shaft 2 is mounted a friction-disk 3, which is provided with a plurality of concentric conical friction-surfaces 4 5, arranged to coact with corresponding conical friction-wheels, all mounted upon a single shaft. 6, 7, and 8 are these conical friction-wheels. They are all mounted upon and keyed to a single shaft 9, which is geared to a transverse shaft 10, provided with a compensating-gear 10' of ordinary construction, the presence of which is merely indicated, and from which the driving-wheels 11 and 12 are driven in any suitable manner.

The friction-wheels 6, 7, and 8 are all keyed or splined to the shaft 9 in such a manner as to be capable of longitudinal movement thereon. Wheels 6 and 7 have a common hub 13, the distance between the two wheels being such that only one of them can be in contact with the inner friction-surface 4 of the friction-disk 3 at any one time. They may be moved along the shaft 9, so as to bring one or the other of them at will into contact with the disk 3, by means of a yoke-arm 14, pivoted to a bracket 29, embracing the hub 13 and connected to a collar on the hub by a pin-andslot connection and at its lower end embracing a nut 14' on the threaded shaft 15, to which nut said arm is connected by a pin-and-slot connection, so that when the shaft 15 is rotated in the one direction or the other the arm 14 and the wheels 6 and 7 are moved in the one direction or the other along the shaft 9. Cone-wheel 8 is moved along the shaft 9 by a similar arm 16, pivoted at one end to the bracket 29 and connected by pin-and-slot connections to a collar on the hub of the wheel 8 and to a nut 16' upon the threaded shaft 17, which is hollow and concentric with the shaft 15.

Inasmuch as the driving mechanism of the wagon is located below the wagon-body, (not shown,) as is ordinarily the case, it is necessary to provide means for rotating the shafts 15 and 17 from a seat on the wagon-body. For this purpose the shafts 15 and 17 are provided with bevel-gears 18 and 19, respectively, meshing with corresponding bevel-gears 20 and 21, respectively, on concentric shafts 22 and 23, which extend upward to a position where they may be reached conveniently by a person in the wagon-body and are there provided with hand-wheels; but any other suitable device may be employed for rotating the shafts 15 and 17, and any other suitable device may be substituted for the screw-and-nut gear herein illustrated and described, for moving the friction-wheels 6, 7, and 8 into and out of contact with the friction-disk 3.

In order to hold the shafts 2 and 9 at the proper relative angle, these shafts have bearings in an integral cast iron or steel yoke 30, secured to the framework of the wagon and which surrounds and incloses the friction-disk 3 and friction-wheels 6, 7, and 8. This yoke from the fact that it completely surrounds and incloses the friction disk and wheels is very rigid and prevents displacement of either of the shafts 2 and 9. The bracket 29, to which the shifting arms 14 and 16 are pivoted, is secured to the caps of the bearings of the shaft 9 in this yoke 30, and is thus secured to and supported by the yoke.

When the friction-wheel 6 is in contact with the friction-disk 3, the shaft 10 is rotated in the direction for moving the wagon forward, the speed being low. When the friction-wheel 8 is in contact with the disk 3, the shaft 10 is also rotated in a forward direction, but at higher speed. When the friction-wheel 7 is in contact with the disk 3, the shaft 10 is rotated in the direction for moving the wagon backward, the speed being low. The wheels 6 and 8 may be termed, respectively, the "low-speed" and the "high-speed" forward wheels, and the wheel 7 may be termed the "reversing-wheel." A high-speed reversing-wheel corresponding to wheel 3, but located upon the reversing side of the disk 3, might be provided, but for motor-wagons, to use in the driving mechanism of which my invention is essary or desirable to provide for moving backward at a high speed. For this reason the high-speed reversing-wheel is not here illustrated.

My invention is not limited to two changes of speed. The friction-disk 3 may have a greater number of concentric conical friction-surfaces, and a corresponding number of conical friction-wheels may be mounted upon the shaft 9.

The operation of my invention is as follows: The engine 1 being in operation and all of the friction-cones being out of contact with the disk 3, to start the wagon forward the hand-wheel of shaft 23 is turned from left to right of Figs. 2 and 4, so moving the cone 6 into contact with the inner friction-ring 4 of disk 3, thus causing the shafts 9 and 10 to revolve. The shaft 23 may be turned only enough at first to produce slight pressure between the cone 6 and disk 3, so as to start easily, and afterward the cone may be forced more firmly against the disk. When slow speed or great power is desired, the wheel 6 will be kept in contact with the disk 3. To cause the wagon to move ahead at greater speed, the hand-wheel of shaft 23 is rotated in the reverse direction—viz.; from right to left—so as to move the wheel 6 away from disk 3, and the hand-wheel of shaft 22 is turned from right to left of Figs. 2 and 4, (the pitch of the screw of shaft 17 being opposite to that of shaft 15,) so moving the cone 8 into contact with the friction-ring 5 of the disk 3. The wagon may be stopped when either the high-speed or the low-speed cone-wheel is in gear by rotating the proper hand-wheel in the opposite direction to that in which it is turned to throw said cone-wheel into gear. The wagon may also be started with the high-speed cone-wheel without first throwing into gear the low-speed cone; but starting the wagon with the high-speed cone direct is apt to cause considerable wear of the friction-surfaces. To move the wagon backward, the hand-wheel of shaft 23 is rotated from right to left of Figs. 2 and 4 until the cone 7 is in contact with the disk 3.

It is obviously impossible that cone-wheels 6 and 7 should both be in contact with disk 3 at the same time, as they are rigidly connected. It is desirable, however, that it shall be impossible also to throw cone 8 into contact with disk 3 while either of cones 6 and 7 are in contact with said disk, or vice versa. For this purpose a locking device is employed, which is shown in detail in Fig. 5. Upon shafts 15 and 17 are two adjacent disks 24 and 25, in the adjacent faces of which are notches, which are opposite each other in that position of the shafts 15 and 17 in which all of the friction-cones are out of gear. Between these disks is a pawl 26, adapted to enter either recess. When the shaft 17, for instance, is rotated to throw cone 8 into gear, the pawl 26 is pushed deeper into the recess tween it and the face of disk 25 to permit it to move out of the recess of disk 24 and so release the shaft 15 until the disk 25 has been brought back into the position in which its recess is opposite the recess in the disk 24. Shaft 15 may then be rotated in either direction, shaft 17 being then locked by the pawl 26 in a similar manner. Preferably the pawl 26 is acted upon by opposing springs 27 and 28, which neutralize each other when the pawl is in mid-position. A slight but perceptible force is thus required to move either shaft out of engagement with its pawl over and above that required to rotate either shaft when out of engagement with the pawl. This slight additional resistance suffices to indicate to the operator when either shaft has been brought back into the position required to release the other shaft.

When the locking device above described is used, the pitch of the screws on the shafts 15 and 17 should be such that the friction-cones may be moved into and out of engagement with the disk 3 with less than a single turn of the hand-wheels.

It will be observed that by causing all of the friction-cones to act upon concentric conical friction-surfaces of a single disk by mounting all of the cones upon a single shaft and by arranging the operating-shafts concentrically a very simple and compact controlling mechanism is produced.

It is obviously possible in such a system of friction-gearing as that herein described to mount the friction-disk 3 on the driven shaft instead of on the driving-shaft and to mount the friction-wheels 6, 7, and 8 upon the driving-shaft instead of upon the driven shaft, and this I regard as within my invention.

Having thus completely described my invention, what I claim, and desire to secure by Letters Patent, is—

1. The combination, with a friction-disk having upon its face a plurality of beveled friction-surfaces arranged concentrically, of a plurality of corresponding beveled friction-wheels adapted to coact therewith, and means for moving said friction-wheels into and out of contact with the corresponding friction-surfaces on said disk, substantially as described.

2. The combination, with a friction-disk having upon its face a plurality of beveled friction-surfaces arranged concentrically, of a plurality of corresponding beveled friction-wheels adapted to coact therewith, mounted upon a common shaft, and having driving connection therewith but movable longitudinally thereon, and means for moving said friction-wheels longitudinally on their shaft, thereby moving them into and out of contact with their corresponding friction-surfaces on said disk, substantially as described.

3. The combination, with a friction-disk having upon its face a plurality of beveled friction-surfaces arranged concentrically, of a plurality of corresponding beveled friction-wheels adapted to coact therewith, mounted upon a common shaft, and having driving connection therewith but movable longitudinally thereon, means for moving said friction-wheels longitudinally on their shaft, thereby moving them into and out of contact with their corresponding friction-surfaces, and means for preventing one of said friction-wheels from being thrown into gear when another friction-wheel is already in gear, substantially as described.

4. The combination, with a friction-disk having upon its face a plurality of beveled friction-surfaces arranged concentrically, of a plurality of corresponding beveled friction-wheels adapted to coact therewith, mounted upon a common shaft, and having driving connection therewith but movable longitudinally thereon, and screw-gearing for moving said friction-wheels along said shaft, thereby throwing them into and out of gear with said friction-disk, substantially as described.

5. The combination, with a friction-disk having upon its face a plurality of beveled friction-surfaces arranged concentrically, of a plurality of corresponding beveled friction-wheels adapted to coact therewith, mounted upon a common shaft, and having driving connection therewith, but movable longitudinally thereon, operating-shafts concentrically arranged, means for rotating said operating-shafts, and screw-and-nut gear operated by said operating-shafts for moving said friction-wheels longitudinally along their shaft, thereby throwing them into and out of gear with the friction-disk, substantially as described.

6. The combination, with a friction-disk having upon its face a plurality of beveled friction-surfaces arranged concentrically, two forward friction-wheels and a reversing friction-wheel, all beveled and mounted upon a common shaft, adapted to coact with the friction-surfaces of said disk, and having driving connection with their shaft but movable longitudinally thereon, one of said forward friction-wheels being so connected with said reversing-wheel that both of said wheels may not be in contact with the disk at any one time, an operating-shaft and a screw-and-nut gear for moving said connected forward and reversing wheels along their shaft, another operating-shaft concentric with the first and a screw-and-nut gear operated thereby for moving the other forward friction-wheel into and out of contact with the disk, and means for preventing the operation of either screw-and-nut gear when one of the friction-wheels operated by the other screw-and-nut gear is in contact with the disk, substantially as described.

7. The combination, with a friction-disk having upon its face a plurality of beveled friction-surfaces arranged concentrically, two forward friction-wheels and a reversing friction-wheel, all beveled and mounted upon a common shaft, adapted to coact with the friction-surfaces of said disk, and having driv ing connection with their shaft but movable longitudinally thereon, one of said forward friction-wheels being so connected with said reversing-wheel that both of said wheels may not be in contact with the disk at any one time, an operating-shaft and means operated thereby for moving said connected wheels into and out of gear with the disk, another operating-shaft and means operated thereby for moving the other forward friction-wheel into and out of contact with the disk, disks upon said operating-shafts having in their adjacent faces recesses which register when all of the friction-wheels are out of contact with the disk, a pawl adapted to enter both of said recesses and so to lock the shafts, and arranged to be moved by each locking-disk, when its shaft is rotated, into the recess of the corresponding disk of the other operating-shaft, thereby locking the same until the first operating-shaft is restored to normal position, substantially as described.

8. In a controlling-gear for motor-vehicles, the combination, with a prime motor, located beneath the body of the vehicle, a friction-disk driven thereby and having a plurality of friction-surfaces arranged concentrically upon its face, a plurality of corresponding friction-wheels adapted to coact therewith, and means for communicating the rotary motion of said friction-wheels to the driving-wheels of the vehicle, of concentric operating-shafts located beneath the body of the vehicle, for moving said friction-wheels into and out of gear with the friction-disk, other concentric operating-shafts connected by suitable gearing to the first-mentioned operating-shafts, and extending upward to a position for convenient operation, and means for rotating said shafts, substantially as described.

9. In a bevel-gear system, the combination, with a plurality of bevel-gears coacting with a single bevel-gear at different radial distances from the center thereof and with different speed ratios, and shafts for said gears, of a yoke having bearings for said shafts, and surrounding and inclosing said gears, thereby holding said shafts in their proper relative positions, substantially as described.

10. In a bevel-gear system, the combination, with a plurality of bevel-gears coacting with a single bevel-gear and having different speed ratios, and shafts for said gears, of a yoke having bearings for said shafts, and surrounding and inclosing said gears, thereby holding said shafts in their proper relative positions, and a bracket supported by said yoke to which shifting levers of the gear system may be connected, substantially as described.

In testimony whereof I affix my signature in presence of two witnesses.

LOUIS B. SMYSER.

Witnesses:
FERDINAND E. CANDA,
HARRY M. MARBLE.